March 12, 1957 C. T. GODDARD 2,785,338

WAVE AMPLIFIER ELECTRON DISCHARGE DEVICE

Filed Oct. 17, 1952 2 Sheets-Sheet 1

INVENTOR
C. T. GODDARD
BY [signature]
ATTORNEY

March 12, 1957 C. T. GODDARD 2,785,338

WAVE AMPLIFIER ELECTRON DISCHARGE DEVICE

Filed Oct. 17, 1952 2 Sheets-Sheet 2

INVENTOR
C. T. GODDARD
BY
ATTORNEY

United States Patent Office 2,785,338
Patented Mar. 12, 1957

2,785,338

WAVE AMPLIFIER ELECTRON DISCHARGE DEVICE

Charles T. Goddard, Basking Ridge, N. J., assignor to Bell Telephone Laboratories, Incorporated, New York, N. Y., a corporation of New York Application October 17, 1952, Serial No. 315,283

10 Claims. (Cl. 315—39)

This invention relates to electron discharge devices and more particularly to such devices especially suitable for the amplification of a wide band of frequencies.

In the design of amplifiers, attention has been directed for some time to the problem of increasing the gain, i. e. the amplification, while at the same time increasing the band width of the frequencies that can be amplified. As these two quantities, gain and band width, are interdependent, a high gain has priorly been attained by a sacrifice in band width or a wide band width by a sacrifice in gain. One type of circuit that has been employed in an attempt to attain high gain with broad band width is that generally identified as a wave or chain amplifier in which a number of tubes are connected between two transmission lines or delay lines and afford the gain of the amplifier. These circuits require a number of separate tubes, separate impedances, capacitances and inductors, and are subject to frequency limitations due to the stray capacitances associated with the individual tube elements and the leads for these elements.

It is an object of this invention to attain amplification of a broad band of frequencies without sacrificing the gain attainable.

It is a further object of this invention to provide an improved wave amplifier wherein all of the elements of the amplifier are situated within a single electron discharge device. Thus it is an object of this invention to simplify wave amplifiers and to considerably reduce their cost.

It is a still further object of this invention to provide advantageous structures for grounded grid wave amplifier triodes.

These and other objects of this invention are attained by positioning the two transmission lines of a wave amplifier within a single electron discharge device. The input transmission line in accordance with a feature of this invention comprises elemental cathode areas interconnected by impedances and a grounded grid electrode adjacent all of the elemental cathode areas, and the output transmission line in accordance with a feature of this invention comprises elemental anode areas interconnected by impedances and the grounded grid electrode. The grounded grid electrode is thus common to both transmission lines and isolates them from each other as to high frequency wave energy so that essentially the only coupling between the two lines is provided by the electron streams of the electron discharge device elements defined by aligned elemental cathode and anode areas and the intervening portion of the grounded grid electrode. The impedances interconnecting the anode elements and the cathode elements and the capacitances between these elements and the interposed grid electrode are such that the phase velocity of the two transmission lines is the same so that the energy transferred from the input transmission line to the output transmission line by the electron streams always arrives in proper phase relationship to increment the electromagnetic wave traveling along the output transmission line. Each line is terminated by an absorption network at its end opposite from the terminals of the device.

In one specific illustrative embodiment of this invention, the impedances between the anode and cathode elements comprise individual turns of a pair of coils mounted adjacent the anodes and cathodes. The anodes are mounted by a single support member and the cathodes are also mounted by a single support member. In this specific embodiment, the grid electrode comprises a plurality of wires positioned between the anode and cathode support members and advantageously secured to one of the members. The support members may be spring biased together to form a compact assembly.

In another specific embodiment of this invention, the two transmission lines comprise ridge-wave guide filter sections, the ridges of one section having a cathodic coating thereon and being heated by an appropriate heater element and the ridges of the other section comprising anode elements and being aligned with the ridges of the first section. The grounded grid electrode advantageously comprises a plurality of wires interposed between the two groups of ridges and may be secured to one of the wave guide sections. The impedances between the anode and cathode elements are thus the resonator sections defined by the wave guide sections between successive ridges.

It is therefore a feature of this invention that an electron discharge device comprise a pair of transmission lines within the envelope of the device and each comprising elemental sections of a plurality of distinct discharge device elements interconnected by impedances and supported by common support elements.

It is a further feature of this invention that an electron discharge device comprise a plurality of discharge elements, the anodes of the discharge elements comprising an output transmission line and the cathodes of the discharge elements comprising an input transmission line, a grounded grid electrode extending between the two transmission lines within the envelope of the electron discharge device and isolating the two lines so that essentially the only coupling therebetween results from the electron streams of the plurality of discharge elements.

It is a feature of one specific embodiment of this invention that the cathode and anode elements be mounted on common support members and that the impedances therebetween comprise individual turns of a pair of coils to which the cathode and anode elements are electrically connected.

It is a feature of another specific embodiment of this invention that the impedances between the cathode and anode elements comprise resonator portions of wave guide sections.

A complete understanding of this invention and of these aforementioned and other desirable features thereof may be gained from consideration of the following detailed description and the accompanying drawing, in which.

Figure 1:
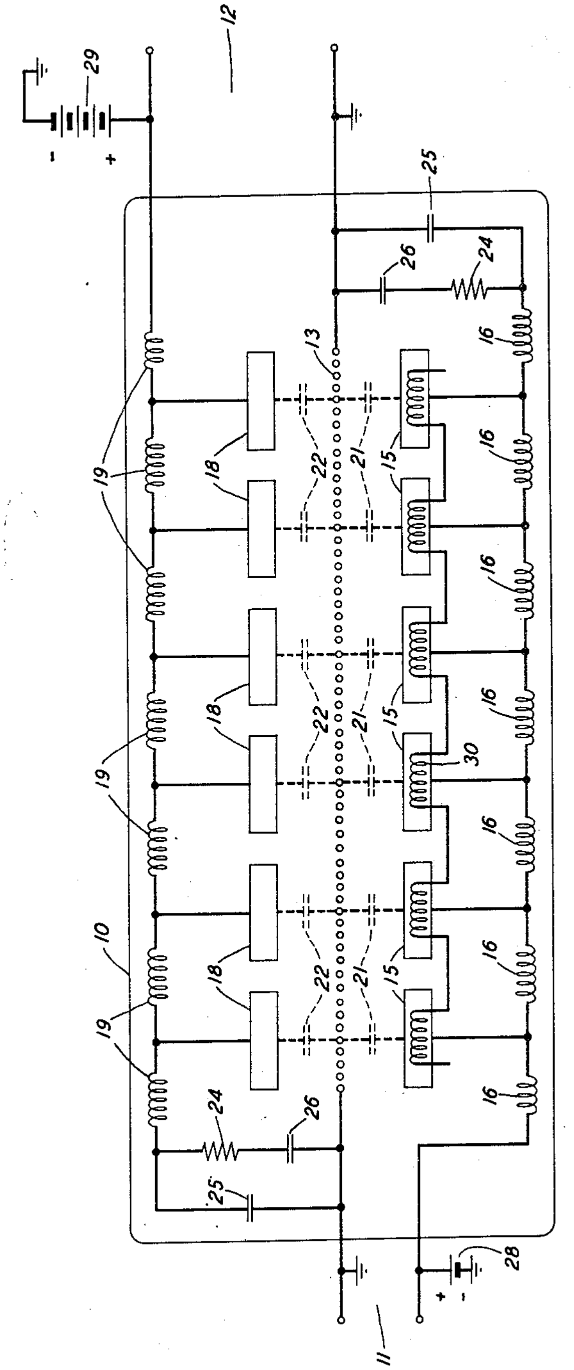
Fig. 1 is a schematic representation of an electron discharge device in accordance with this invention.

Turning now to the drawing, Fig. 1 is a schematic representation of an electron discharge device in accordance with this invention. As there depicted, the device comprises an envelope 10 into which extend an input transmission line 11 and an output transmission line 12, the two transmission lines having in common the grounded electrode 13 as one element of each of the lines. The input transmission line 11 comprises within the envelope 10 a plurality of discrete cathode elements 15 joined together by a plurality of impedances or transducer elements 16. The output transmission line 12 similarly comprises a plurality of discrete anode elements 18 joined together by a plurality of impedances or transducer element 19, the anode elements 18 and the cathode elements 15 being aligned and defining together with the portion of the electrode 13 intermediate them a plurality of triode discharge devices. As the transmission lines are electrically isolated by the common grounded electrode 13, the electron streams of the triode devices thus defined constitute essentially the only coupling between them.

In addition to the lumped impedances 16 and 19, there is present in each transmission line a distributed capacitance existing between the cathode elements 15 and the grid 13 in the input line 11, and designated by the numeral 21, and existing between the anode elements 18 and the grid 13 in the output line 12 and designated by the numeral 22. Each line is terminated by impedance terminating elements, such as resistor 24 in parallel with capacitor 25, a direct current blocking capacitor 26 being in series with the resistor 24. Direct current biases are advantageously applied to the cathode elements 15 and the anode elements 18 by voltage sources 28 and 29 respectively. A heater coil 30 is positioned adjacent each of the cathode elements 15.

In the operation of the electron discharge device illustrated in Fig. 1, an input electromagnetic wave is applied to the input transmission line 11 and in traveling along the line it alters the potential difference between the cathode sections 15 and the portion of the control grid 13 adjacent thereto, thereby varying the electron stream of each of the discharge device elements. These electron streams impinge on the anode elements 18 and cause an output wave to travel along the output transmission line 12. This output wave caused by the coupling of the electron streams to the input wave actually will travel in both directions from each anode element 18 but the backward wave is absorbed by the terminating network comprising the resistor 24 and capacitor 25; similarly the input wave after traveling down the input transmission line is absorbed by the terminating network connected to the input line.

The impedances 16 and 19 which connect successive cathode elements 15 and anode elements 19, respectively, together with the distributed capacitances 21 and 22 are chosen so that the phase velocity of the two transmission lines is the same. Thus the electron stream of each successive electron discharge device element supplies energy to the output wave in proper phase to cause that wave to build up so that the output voltage across the transmission line 12 is due to the summation of the electron streams of the discharge device elements of the device.

Figure 3:
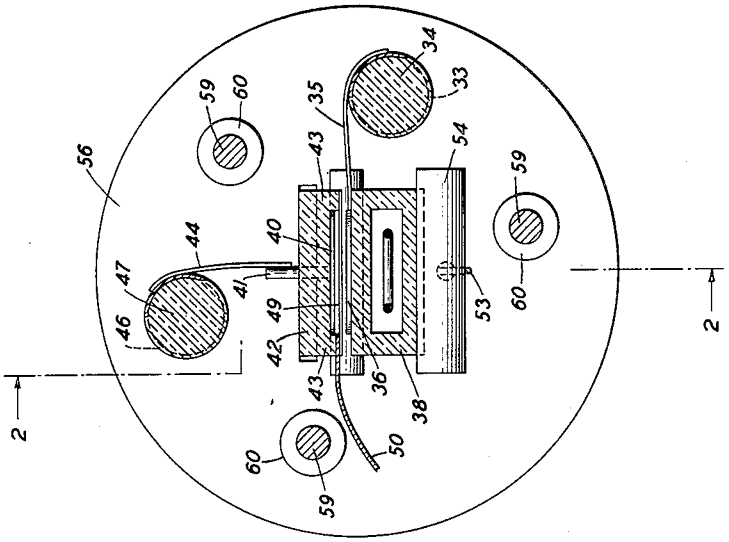
Fig. 3 is a sectional view of the embodiment of Fig. 2 along the line 3—3 thereof.
Figure 2:
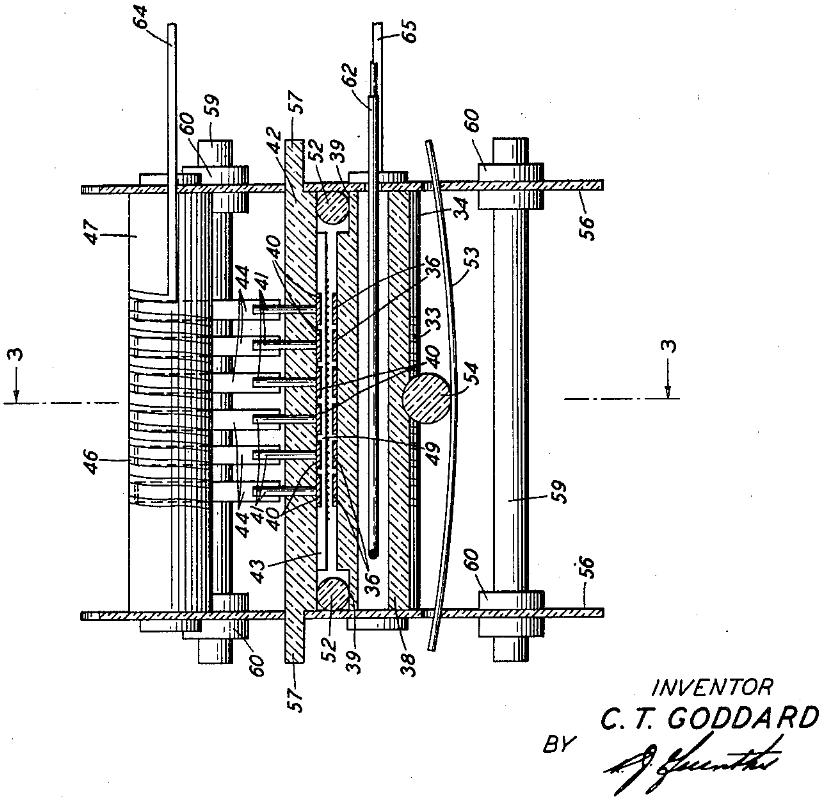
Fig. 2 is a cross-sectional view of one specific illustrative embodiment of this invention, the envelope and terminal connections therethrough not being shown.

One specific structural embodiment of this invention is shown in Figs. 2 and 3. In this embodiment, the impedances 16 and 19 which interconnect successive cathode and anode elements 15 and 18 are each defined by a coil wound upon a ceramic post, individual turns of the coil being tapped off to each of the electrode elements. Thus the cathode impedances 16 are defined each by turns of the coil 33, best seen in Fig. 3, which is wound on ceramic or other insulating post 34 and connected by tabs 35 to each elemental cathode section 36. The cathode sections 36 are each supported on the upper surface of a hollow rectangular ceramic block 38 having stepped end portions 39. The cathode sections may advantageously be each a separate plate member affixed to the upper surface of the insulator block 38, or they may be fabricated by coating the entire upper surface of the block 38 with cathodic material and then cutting fine grooves in the cathode material and down to the insulating surface of the block 38 to define the elemental cathode sections 36. Alternatively the surface of the block may have small channel portions cut into it and then be coated with a cathodic material, following which the surface is ground down so that the insulating surface reappears between the grooves but the grooves remain filled with the cathodic material and the cathode sections 36 are inlaid into the surface of the insulator block 38. In such case, the tabs 35 from each cathode section 36 to a turn of the coil 33 may be positioned in the groove before the cathodic material is deposited therein.

Each anode element 18 may be a small plate member 40 supported by a pin 41 extending through the back of an anode insulator block 42 which has slight sides 43, the anode block 42 being thus channel shaped. Each anode member 40 is connected through the pin 41 and a tab 44 to a turn of the anode coil 46 which is located on a ceramic or other insulator post 47 and may be identical with the cathode coil 33.

The grounded grid electrode 13 comprises a plurality of fine wires 49 which extend across the anode insulator block 42 and are secured to the sides 43 of the block 42. A grid lead member 50 is interposed between one of the sides 43 and the wires 49 and extends the whole length of the grid 13 whereby a low impedance ground connection is supplied to the grid 13 along its entire length. Advantageously the envelope of the device, not shown, is metallic and defines the ground so that the long lead member 50 can be connected directly to the envelope.

A pair of ceramic rods 52 rest on the stepped end portions 39 and are between the two insulator block members 38 and 42 to define the spacing between the cathode sections 36 and the control grid wires 49, the cathode block member 38 being spring biased against the rods 52 by a spring wire 53 bearing against a ceramic rod 54 positioned against the back of the cathode block member 38 adjacent the middle portion thereof. The desired spacing between the elements is thus attained as disclosed in my Patent 2,663,819, issued December 22, 1953.

The ceramic rods 34 and 47 on which the cathode and anode impedance coils 33 and 46, respectively, are wound are supported by end insulator discs 56, which may advantageously be of mica, and through which the end portions 57 of the anode insulator block member 42 extend. The two insulator discs 56 may be supported together by posts 59 to which they are attached by eyelets 60. A cathode heater wire 62, equivalent to the heater element 30 of the schematic embodiment of Fig. 1, extends through apertures in one of the discs 56 and into the hollow central portion of the hollow cathode insulator block member 38.

The terminals of the device are connected to the end 65 of the coil 33 for the input transmission line 11 and to the end 64 of the coil 46 for the output transmission line 12. Thus only these two coil ends 64 and 65 need be connected to terminals, in addition to the terminals for the heater wire 62, to provide proper connection to all of the active and passive elements of the triode wave amplifier.

Figure 4:
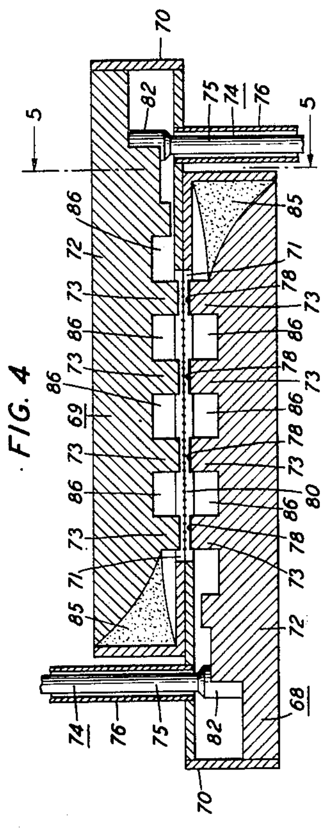
Fig. 4 is a cross-sectional view of another specific illustrative embodiment of this invention.

In the above-described embodiment, the coupling impedances between the elemental anode and cathode sections are provided by turns of inductances, but various other impedances or transducers could be employed. Thus in the specific illustrative embodiment depicted in Figs. 4 and 5 these coupling impedances are provided by cavity resonators. Turning now to those figures, the electron discharge device there depicted comprises a pair of substantially identical wave guide filter sections 68 and 69 each comprising a cover member 70 having an aperture 71 therein, a base member 72 having a plurality of upright posts or ridges 73, and a coaxial terminal 74 having its inner conductor 75 connected to the base member 72 and its outer conductor 76 connected to the cover member 70. The apertures 71 are aligned and the upright posts 73 are also aligned, the upright posts 73 of wave guide section 68 having electron emissive surfaces 78 facing the upright portions of the wave guide section 69. A grid electrode 80 extends across the apertures 71 and advantageously comprises a plurality of fine wires attached to one of the wave guide sections, the grid electrode 80 isolating the two wave guide sections so that essentially the only coupling between the transmission lines defined by the wave guide filter sections 68 and 69 is provided by the electron streams from the cathode upright posts to the adjacent anode upright posts.

Figure 5:
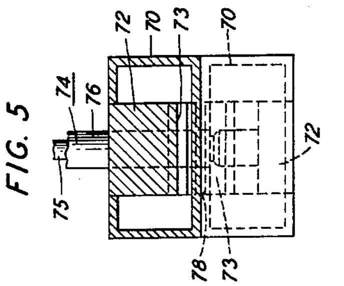
Fig. 5 is a sectional view of the embodiment of Fig. 4 along the line 5—5 thereof.

The inner conductors of the coaxial terminals 74 have ridge wave guide transducer elements 82 to match the impedance of the coaxial terminals to that of the wave guide sections. The base members 72, as best seen in Fig. 5, are advantageously narrower than the cover members 70.

Each wave guide section advantageously has a resistive card termination 85 at the end opposite the terminal 74, the resistive card termination comprising the terminating impedance 24 for the transmission line defined by the wave guide section. A heater element, not shown, is also advantageously positioned within the wave guide section to heat each of the individual cathode sections defined by the cathodic coating 78 on the cathode posts 73.

The impedances of transducers 16 and 19 between the cathode and anode elements 15 and 18 in the schematic representation of Fig. 1 are thus defined by the resonator portions 86 between adjacent upright posts or ridges 73 in each wave guide filter section. As the wave guide sections 68 and 69 are advantageously identical except for the provision of cathodic coating 78 and a heater element for the input section 68, the impedances defined by the resonator portions 86 are identical and the two transmission lines are of the same phase velocity.

Reference is made to my application Serial No. 315,281, filed October 17, 1952, wherein a related invention is described.

It is to be understood that the above-described arrangements are illustrative of the application of the principles of the invention. Numerous other arrangements may be devised by those skilled in the art without departing from the spirit and scope of the invention.

What is claimed is:

1. An electron discharge device comprising an envelope, an input and an output transmission line extending through said envelope and comprising within said envelope elemental sections of a plurality of distinct discharge device elements, impedance means connected between successive ones of said elemental sections of said lines, corresponding ones of said elemental sections being electrically connected in series to receive successively wave energy transmitted along said transmission lines, electrode means within said envelope isolating said transmission lines as to high frequency wave energy, the electron streams of said discharge device elements being substantially the only coupling between said lines, input means for applying an input signal solely to the first discharge device element in said input transmission line, output means for removing an output signal solely from the last discharge device element in said output transmission line, and second impedance means terminating the end of each of said transmission lines removed from said input and output means.

2. An electron discharge device comprising an envelope, an input and an output transmission line extending through said envelope and each comprising within said envelope elemental sections of a plurality of distinct discharge device elements, a common support member for the elemental sections of each of said transmission lines, first impedance means connected between successive ones of said elemental sections of said lines, corresponding ones of said elemental sections being electrically connected in series to receive successively wave energy transmitted along said transmission lines, second impedance means terminating one end of each of said transmission lines, electrode means within said envelope isolating said transmission lines as to high frequency energy, the electron streams of said discharge device elements comprising substantially the only coupling between said lines, means for applying an input signal solely to the first discharge device element in said input transmission line, and means for receiving an output signal solely from the last discharge device element in said output transmission line.

3. An electron discharge device in accordance with claim 2 wherein said first impedance means are also supported by said common support members.

4. An electron discharge device comprising an envelope, an input transmission line extending through said envelope and comprising within said envelope a plurality of cathode elements electrically connected in series to receive successively wave energy transmitted along said input transmission line, a common support member for said cathode elements, first impedance means between said cathode elements, and a grounded grid electrode, an output transmission line extending through said envelope and comprising within said envelope a plurality of anode elements electrically connected in series to receive successively wave energy transmitted along said output transmission line, second impedance means between said anode elements, and said grounded grid electrode, said anode elements being aligned with said cathode elements and defining with the portion of said grid electrode interposed therebetween discharge device elements and the electron streams of said discharge device elements being substantially the only coupling between said lines, third impedance means terminating one end of each of said transmission lines, means for applying an input signal solely to said grid electrode and the first cathode element of said input transmission line, and means for removing an output signal solely from said grid and the last anode element of said output transmission line.

5. An electron discharge device in accordance with claim 4 wherein said first and second impedance means comprise a pair of coils positioned within said envelope and comprising means electrically connecting each of said cathode elements to distinct turns of one of said coils and means electrically connecting each of said anode elements to distinct turns of the other of said coils.

6. An electron discharge device comprising an envelope, an input transmission line extending through said envelope and comprising within said envelope a plurality of cathode elements electrically connected in series to receive successively wave energy transmitted along said input transmission line, a common support member for said cathode elements, first impedance means connected between successive ones of said cathode elements, and a grounded grid electrode, an output transmission line extending through said envelope and comprising within said envelope a plurality of anode elements electrically connected in series to receive successively wave energy transmitted along said output transmission line, a common support member for said anode elements, second impedance means connected between successive ones of said anode elements, said grounded grid electrode, and third impedance means terminating one end of each of said transmission lines, said anode elements being aligned with said cathode elements and defining with the portion of said grid electrode interposed therebetween electron discharge device elements and the electron streams of said discharge elements comprising substantially the only coupling between said lines, means for applying an input signal to said grid and only the first cathode element of said input transmission line, and means for receiving an output signal from said grid and only the last anode element of said output transmission line.

7. An electron discharge device in accordance with claim 6 wherein said first and second impedance means connected between said cathode elements and said anode elements comprise resonator sections defined by said common support members.

8. A wave amplifier electron discharge device comprising a first support member, a plurality of cathode elements supported by said first support member, a first coil positioned to one side of said first support member, means electrically connecting each of said cathode elements to distinct turns of said first coil, a second support member, a plurality of anode elements supported by said second support member, a second coil positioned to one side of said second support member, means electrically connecting each of said anode elements to distinct turns of said second coil, said anode elements being aligned with said cathode elements, a grid electrode comprising a plurality of wires extending between said cathode elements and said anode elements, said cathode elements, turns of said first coil, and grid electrode comprising an input transmission line, said cathode elements being electrically connected in series to receive successively wave energy transmitted along said input transmission line and said anode elements, turns of said second coil, and grid electrode comprising an output transmission line, said anode elements being electrically connected in series to receive successively wave energy transmitted along said output transmission line, means applying a ground potential to said grid electrode to isolate said transmission lines as to high frequency wave energy.

9. A wave amplifier electron discharge device comprising an envelope, a first support member within said envelope, a plurality of cathode elements mounted on one surface of said first support member, a first post within said envelope, a first coil wound on said first post, tab means electrically connecting each of said cathode elements to distinct turns of said first coil, a second support member within said envelope adjacent said first support member, a plurality of anode elements mounted on one surface of said second support member, said anode elements being opposite to and aligned with said cathode elements, a second post within said envelope, a second coil wound on said second post, tab means electrically connecting said anode elements to distinct turns of said second coil, a plurality of wires extending between said first and second support members and defining a grid electrode between said cathode elements and said anode elements, said cathode elements, turns of said first coil, and wires defining an input transmission line and said anode elements, turns of said second coil, and wires defining an output transmission line, means for applying a ground potential to said wires to isolate said transmission lines as to high frequency wave energy, impedance means terminating one end of each of said transmission lines, means positioning said wires from said cathode elements, and means mounting said first and second support members together in a compact assembly.

10. A wave amplifier electron discharge device comprising an input wave guide section comprising a conducting member having a plurality of upright ridges defining cathodes on one surface, said ridges defining resonator portions therebetween, and a cover member encompassing said conducting member and having an aperture therein adjacent said upright ridges, an output wave guide section comprising a conducting member having a plurality of upright ridges defining anodes on one surface aligned with said cathode ridges of said first wave guide section and defining resonator portions therebetween and a cover member encompassing said conducting member and having an aperture therein adjacent said upright ridges and mating with said aperture in said first cover member, a grid element comprising a plurality of fine wires extending across said mating apertures and connected to said cover members to isolate said input and output wave guide sections as to high frequency wave energy, input means for transfering energy to one end of said input wave guide section, output means for transfering energy from the opposite end of said output wave guide section, and impedance means for terminating the other ends of each of said wave guide sections.

References Cited in the file of this patent

UNITED STATES PATENTS

| | | |
|---|---|---|
| 2,122,538 | Potter | July 5, 1938 |
| 2,595,677 | Law | May 6, 1952 |
| 2,698,398 | Ginzton | Dec. 28, 1954 |